(12) United States Patent
Da Costa et al.

(10) Patent No.: US 11,052,852 B2
(45) Date of Patent: Jul. 6, 2021

(54) IMPACT DETECTION SYSTEM

(71) Applicant: Technological Resources Pty. Limited, Melbourne VIC (AU)

(72) Inventors: Ilidio Gouveia Da Costa, Kardinya (AU); Anthony Michael Godber, Karratha (AU); David Wallis, Manning (AU); Matthew Shurmer, Mount Hawthorn (AU); Paul Nicholson, Scarborough (AU); Gareth Topham, Mullaloo (AU); Richard Pearman, Eagle Farm (AU); Peter Knight, Eagle Farm (AU)

(73) Assignee: Technological Resources Pty. Limited, Melbourne (AU)

( * ) Notice: Subject to any disclaimer, the term of this patent is extended or adjusted under 35 U.S.C. 154(b) by 342 days.

(21) Appl. No.: 15/740,447

(22) PCT Filed: Jul. 14, 2016

(86) PCT No.: PCT/AU2016/050620
§ 371 (c)(1),
(2) Date: Dec. 28, 2017

(87) PCT Pub. No.: WO2017/008122
PCT Pub. Date: Jan. 19, 2017

(65) Prior Publication Data
US 2018/0194314 A1 Jul. 12, 2018

(30) Foreign Application Priority Data
Jul. 14, 2015 (AU) .................. 2015902787

(51) Int. Cl.
*B60R 21/0134* (2006.01)
*G07C 5/08* (2006.01)
(Continued)

(52) U.S. Cl.
CPC ...... *B60R 21/0134* (2013.01); *B61L 15/0081* (2013.01); *B61L 23/041* (2013.01);
(Continued)

(58) Field of Classification Search
CPC .............. B60R 21/013; B60R 21/0132; B60R 21/0134; B60R 21/0136; B60R 2021/0027; B60R 2021/01302; B60R 2021/01322
See application file for complete search history.

(56) References Cited

U.S. PATENT DOCUMENTS 4,079,624 A * 3/1978 Kurtz .................. G01L 1/18
73/781
5,157,268 A * 10/1992 Spies .................. B60R 21/0132
280/735
(Continued)

FOREIGN PATENT DOCUMENTS

| EP | 1418556 A1 | 5/2004 |
|----|------------|--------|
| GB | 2465970 A | 6/2010 |
| WO | 2014/171863 A1 | 10/2014 |

OTHER PUBLICATIONS

Sep. 7, 2015—International-Type Search Report and Written Opinion of AU2015902787.
(Continued)

*Primary Examiner* — Zachary L Kuhfuss
(74) *Attorney, Agent, or Firm* — Banner & Witcoff, Ltd.

(57) ABSTRACT

An impact detection system is disclosed for detecting and identifying an object colliding with a vehicle. The impact detection system comprises a sensor arrangement arranged to measure a characteristic of an impact of the object against the vehicle, a trigger determiner associated with the sensor arrangement for determining whether the characteristic of the 5 impact is greater than a predefined threshold value, and an image capturing device arranged to capture an image of
(Continued)

the object. The system is arranged to automatically make the captured image available for inspection in response to the trigger determiner determining that the characteristic of the impact is greater than the predefined threshold value so that the object in the image can be identified substantially in real-time.

28 Claims, 3 Drawing Sheets

(51) Int. Cl.
| | |
|---|---|
| *G01P 15/08* | (2006.01) |
| *B61L 15/00* | (2006.01) |
| *B61L 23/04* | (2006.01) |
| *B61L 27/00* | (2006.01) |
| *G06T 7/20* | (2017.01) |
| *B60R 21/013* | (2006.01) |
| *B60R 21/0132* | (2006.01) |

(52) U.S. Cl.
CPC ...... *B61L 27/0094* (2013.01); *G01P 15/0891* (2013.01); *G06T 7/20* (2013.01); *G07C 5/0891* (2013.01); *B60R 2021/01302* (2013.01); *B60R 2021/01322* (2013.01); *G06T 2207/30261* (2013.01)

(56) References Cited

U.S. PATENT DOCUMENTS

| | | | | |
|---|---|---|---|---|
| 6,088,635 A * | 7/2000 | Cox | ...................... | B61L 23/041 246/115 |
| 6,421,080 B1 * | 7/2002 | Lambert | ................ | H04N 7/181 348/143 |
| 6,586,926 B1 * | 7/2003 | Bomya | ............... | B60R 21/0136 280/735 |
| 6,630,884 B1 | 10/2003 | Shanmugham | | |
| 6,856,873 B2 * | 2/2005 | Breed | ..................... | B60N 2/002 180/271 |
| 7,359,782 B2 * | 4/2008 | Breed | ................. | B60R 21/0134 701/45 |
| 7,486,803 B2 * | 2/2009 | Camus | .................. | B60R 21/013 382/104 |
| 7,671,723 B2 * | 3/2010 | Theisen | .............. | B60R 21/0136 340/425.5 |
| 8,139,820 B2 * | 3/2012 | Plante | .................... | G07C 5/008 340/438 |
| 8,249,798 B2 * | 8/2012 | Hawes | .................. | G01S 17/931 701/300 |
| 9,402,060 B2 * | 7/2016 | Plante | .................... | H04L 67/12 |
| 9,472,029 B2 * | 10/2016 | Plante | .................... | G07C 5/008 |
| 9,491,420 B2 * | 11/2016 | Mimar | ................... | H04N 7/188 |
| 9,501,878 B2 * | 11/2016 | Palmer | ................. | G07C 5/0841 |
| 9,633,318 B2 * | 4/2017 | Plante | .................... | G06Q 10/00 |
| 9,663,127 B2 * | 5/2017 | Palmer | ................. | B61L 25/02 |
| 9,691,195 B2 * | 6/2017 | Plante | .................... | G07C 5/008 |
| 9,738,156 B2 * | 8/2017 | Plante | .................... | G07C 5/008 |
| 9,942,526 B2 * | 4/2018 | Plante | .................... | G06F 9/451 |
| 10,471,828 B2 * | 11/2019 | Plante | .................... | G07C 5/008 |
| 2003/0020812 A1 * | 1/2003 | Gutta | .................... | B60R 21/013 348/148 |
| 2003/0028298 A1 * | 2/2003 | Macky | .................. | G07C 5/008 701/33.4 |
| 2004/0107033 A1 * | 6/2004 | Rao | ...................... | B60R 21/0134 701/45 |
| 2005/0131646 A1 | 6/2005 | Camus | | |
| 2008/0147266 A1 * | 6/2008 | Plante | .................... | G07C 5/008 701/33.4 |
| 2013/0267194 A1 | 10/2013 | Breed | | |
| 2014/0300739 A1 | 10/2014 | Mimar | | |
| 2016/0114820 A1 * | 4/2016 | Palmer | ................... | B61L 25/02 246/107 |
| 2018/0194314 A1 * | 7/2018 | Da Costa | ............ | G01P 15/0891 |

OTHER PUBLICATIONS

Oct. 24, 2016—International Search Report and Written Opinion of PCT/AU2016/050620.
Jun. 8, 2017—Written Opinion of the International Preliminary Examining Authority—PCT/AU2016/050620.
Nov. 15, 2017—International Preliminary Report on Patentability—PCT/AU2016/050620.

* cited by examiner

IMPACT DETECTION SYSTEM

CROSS-REFERENCE TO RELATED APPLICATIONS

The present application is a U.S. National Phase filing of International Application No. PCT/AU2016/050620, filed on Jul. 14, 2016, and claiming priority to Australian Patent Application No. 2015902787 filed Jul. 14, 2015. The present application claims priority to and the benefit of all the above-identified applications, which are all incorporated by reference herein in their entireties.

Field of the Invention

The present invention relates to an impact detection system for a vehicle and a method of detecting an impact on a vehicle.

BACKGROUND OF THE INVENTION

Trains that transport mined material from a mine operation such as a mine site typically operate along fenced railways with restricted access. However, in unrestricted areas that are not fenced, trains periodically collide with cattle or wildlife that wanders onto the railroad track. The trains may also collide with other vehicles or pedestrians. Similar such collisions can also occur with road vehicles travelling along roads, such as freeways and highways, which are normally fenced near or within urban areas but become unfenced as they enter rural areas.

Upon occurrence of an impact, the train may need to stop in order to determine with which object the train collided, which is undesirable for many operators. In many instances, if a train collides with livestock such as a cow, it may not be necessary for the train to stop. However, it would be advantageous to know that the train has collided with a cow so that the owner of the cow can be reimbursed.

Similar recording of a collision would also be advantageous on any road vehicles, such as goods trucks and road-trains, which also often traverse long distances and that may collide with livestock on a road, but that may not need to stop after such a collision.

SUMMARY OF THE INVENTION

According to a first aspect of the invention, there is provided an impact detection system for a vehicle, the impact detection system comprising:
a sensor arrangement arranged to measure a characteristic of an impact of an object against the vehicle;
a trigger determiner associated with the sensor arrangement for determining whether the characteristic of the impact is greater than a predefined threshold value; and
an image capturing device arranged to capture an image of the object;
wherein the system is arranged to automatically make the captured image available for inspection in response to the trigger determiner determining that the characteristic of the impact is greater than the predefined threshold value so that the object in the image can be identified substantially in real-time.

In an embodiment, the impact detection system comprises a storage device, wherein the image capturing device is arranged to continuously capture images and store the images in the storage device, and the system is arranged to retrieve the captured image of the object from the storage device in response to the trigger determiner determining that the characteristic of the impact is greater than the predefined threshold value.

In an embodiment, the system is arranged to tag the captured image of the object in the storage device in response to the trigger determiner determining that the characteristic of the impact is greater than the predefined threshold value, and to make the tagged image available for inspection so that the object in the image can be identified substantially in real-time.

In an embodiment, the image capturing device is arranged to capture an image of the object in response to the trigger determiner determining that the characteristic of the impact is greater than the predefined threshold value.

In an embodiment, the sensor arrangement comprises a transducer capable of generating an electrical signal that varies according to impact force applied to the transducer. The transducer may be a force washer.

In an embodiment, the sensor arrangement comprises an array of transducers, wherein the signals generated by the transducers are combined.

In an embodiment, the sensor arrangement comprises an accelerometer arranged to generate an electrical signal that varies in response to movement of a part of the vehicle caused by a head-on impact, and the system is arranged to:
determine whether a magnitude of the electrical signal is greater than a predefined threshold value; and
automatically make a captured image available for inspection in response to determining that the magnitude of the electrical signal is greater than the predefined threshold value so that the object in the image can be identified substantially in real-time.

In an embodiment, the impact detection system comprises a discriminator arranged to discriminate between signals generated by a collision with an object and signals generated in error by a non-collision.

The discriminator may be arranged to recognise signals generated in error resulting from:
vibrations experienced by the vehicle as the vehicle moves during use;
surface anomalies of a surface on which the vehicle is travelling; and/or
electrical noise.

In an embodiment, the predefined threshold value is equivalent to an impact by an object having a relative momentum with respect to the vehicle greater than substantially 150 kg·m·s$^{-1}$.

In an embodiment, the image capturing device comprises a camera arranged to capture a still image. The camera may be arranged to capture multiple successive still images at predetermined time intervals.

In an embodiment, the image capturing device comprises a video camera arranged to capture a video recording. The system may be arranged to extract a still image frame from the video recording.

In an embodiment, the system comprises a communication system arranged to communicate with a remote operation centre.

The system may be arranged to use the communications system to automatically communicate the captured image to the operation centre in response to the trigger determiner determining that the characteristic of the impact is greater than the predefined threshold value so that the object in the image can be identified substantially in real-time at the operation centre.

Alternatively, the system may be arranged to send an alert signal to the operation centre to indicate to the operation centre that a captured image is available for inspection.

In an embodiment, the system is arranged to analyse the image so as to automatically identify the object.

In an embodiment, the image capturing device is arranged to capture several images, wherein the captured images cover a period of time encompassing a time of the collision.

According to a second aspect of the invention, there is provided a railroad train including an impact detection system according to the first aspect of the invention. The railroad train may be an autonomously controlled railroad train.

In an embodiment, the impact detection system is mounted onto a cowcatcher of the railroad train.

According to a third aspect of the invention, there is provided a road vehicle including an impact detection system according to the first aspect of the invention.

According to a fourth aspect of the invention, there is provided a method of detecting an object colliding with a vehicle, the method comprising:

determining a characteristic of an impact of the object against the vehicle;

determining whether the characteristic of the impact is greater than a predefined threshold value;

capturing an image of the object;

automatically making the captured image available for inspection in response to the trigger determiner determining that the characteristic of the impact is greater than the predefined threshold value so that the object in the image can be identified substantially in real-time.

BRIEF DESCRIPTION OF THE DRAWINGS

The invention will be more fully understood from the following description of specific embodiments of the invention. The description is provided with reference to the accompanying drawings.

DETAILED DESCRIPTION OF AN EMBODIMENT OF THE INVENTION

Embodiments of the present invention relate to an impact detection system for a vehicle, particularly a train, such as of a type suitable for transporting mined material from a mine operation. The train may for example be autonomously controlled. However, trains that are at least partially controlled by a human operator as well as road vehicles are also envisaged.

The impact detection system comprises a sensor arrangement for measuring a characteristic of an impact when the train collides with or impacts against an object. The impact detection system further comprises a trigger determiner that determines whether the detected characteristic exceeds a predefined threshold value. The sensor arrangement may for example comprise one or more load sensitive sensors, wherein each load sensitive sensor generates a variable electrical signal which changes in response to the impact force applied to the sensor.

The impact detection system further comprises an image capturing device that is disposed on the train so as to face outwardly and arranged to capture at least one image of the object with which the train has collided. For example, an image may be captured that is representative of a field of view from the train at the time of the collision.

When a characteristic of the impact is detected that is above the predefined threshold value, at least one of the captured image is automatically made available for inspection enabling the object to be identified. The object may for example be a stationary object or a moving object such as a vehicle, a person or an animal.

The captured image may for example be made available by automatically communicating the image to an operation centre where the object with which the train collided can be identified.

The impact detection system in accordance with embodiments of the present invention provides significant advantages. In particular, the system enables informed decisions to be made as to whether the train needs to stop or can continue without stopping following detection of a collision based on identification of the object that was struck.

Figure 1:
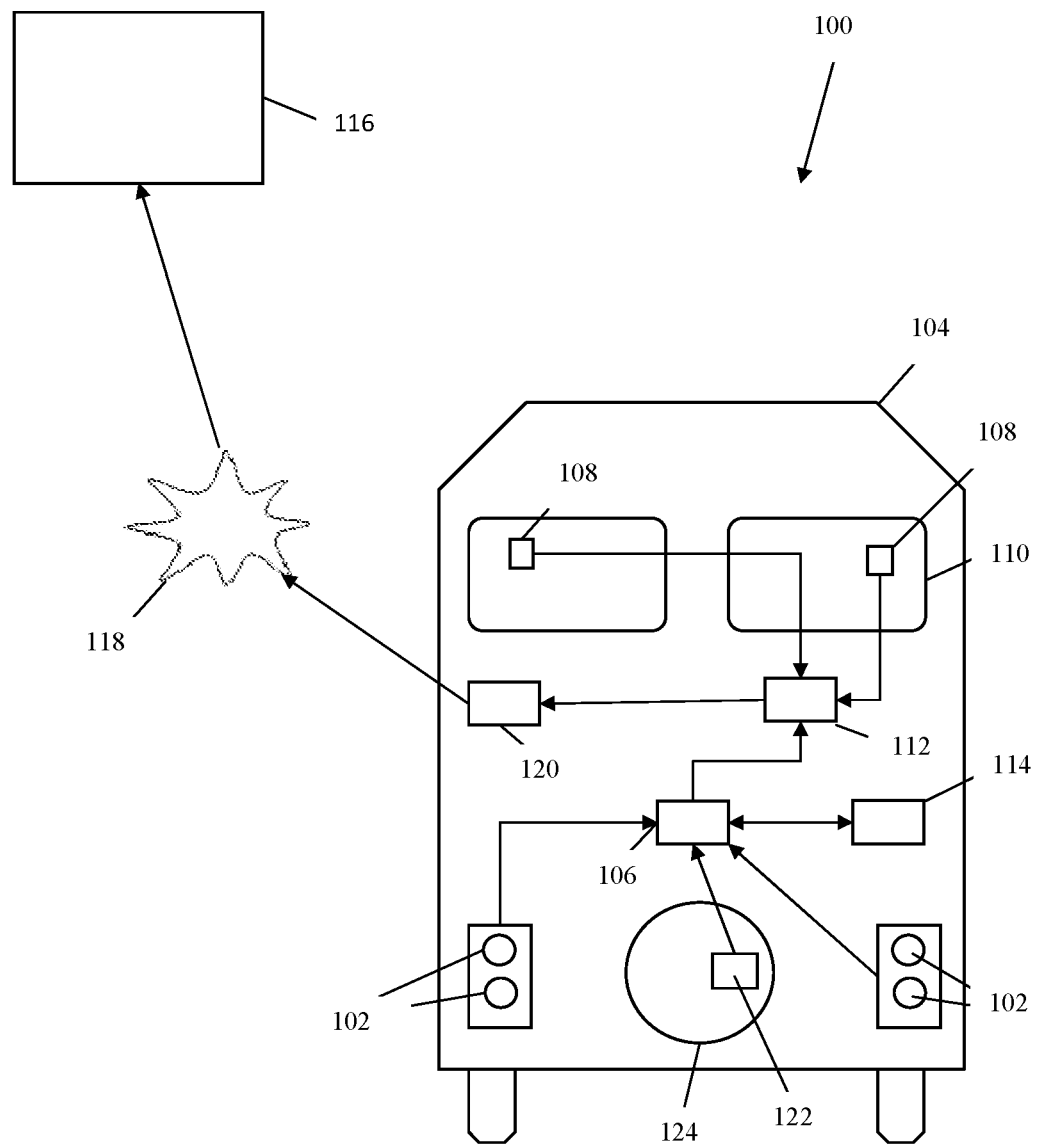
FIG. 1 is a schematic representation of an impact detection system in accordance with an embodiment of the present invention.

Referring initially to FIG. 1 of the accompanying drawings, there is shown a schematic representation of an impact detection system 100 for a vehicle in accordance with an embodiment of the present invention. The vehicle in this embodiment is a train that is autonomously controlled.

In this particular example, the sensor arrangement of the impact detection system 100 comprises four load sensitive sensors 102. However, any suitable number of sensors that are arranged to detect a force of an impact is envisaged. Each sensor 102 generates an electrical signal such as a voltage that changes in response to a force applied to the sensor 102. In this embodiment, the sensors 102 are disposed on a locomotive body 104 of the train. Specifically, the sensors 102 are disposed on respective bolts of the locomotive body 104 as further illustrated in FIG. 2.

The generated electrical signals are collected at a control unit 106 which is arranged to control and coordinate operations of components of the system 100. This control unit 106 may for example be implemented using a processor. The impact detection system 100 further comprises an amplifier (not shown) that amplifies the electrical signals generated by the load sensitive sensors 102.

The impact detection system 100 further comprises an image capturing device 108. In this example, the impact detection system 100 comprises two image capturing devices 108, each of which is positioned within the cockpit of the locomotive such that images can be captured through a windscreen 110 of the train. In this example, each of the image capturing devices 108 is arranged to capture video. The video is typically captured continuously from the cockpit of the locomotive 104 and image frames of the video are stored in a storage device 112, such as a hard disc of a computer. In this implementation, the image frames are stored in the storage device 112 for a predetermined time period before being erased. For example, the image frames may be stored in the storage device 112 for at least 12 hours, 24 hours, 2 days or 7 days.

It will be appreciated that the image capturing devices 108 may alternatively capture multiple successive still images that are captured at predetermined intervals.

When the load sensitive sensors 102 detect an impact force of an object impacting against the sensors, they generate a corresponding electrical signal. The control unit 106 together with a trigger determiner 114 determines whether the impact force detected by the sensors 102 exceeds a predefined threshold value. For example, the electrical signal generated by each load sensitive sensor 102 may be communicated to the trigger determiner 114 such that any one of the load sensitive sensors 102 may generate a trigger signal that causes at least one captured image to be automatically made available for inspection. The predefined threshold value can, for example, be equivalent to an impact by an object that has a relative momentum with respect to the locomotive greater than 150 kg·m·s$^{-1}$.

When the impact force detected by the sensors 102 exceeds the predefined threshold value, the control unit 106 tags an image frame of the captured video stored at the storage device 112. The tagged image frame is representative of a field of view from the train substantially at impact.

The control unit 106 then instructs the system 100 to retrieve the tagged image frame from the storage device 112 and to communicate the tagged image frame to an operation centre 116 that is remote relative to the system 100. In this particular example, at least one additional image frame that was captured before occurrence of the impact is retrieved from the storage device 112 and communicated to the operation centre 116. In this way, upon inspection of the image frame, a human operator at the operation centre can identify the object that the train collided with based on the image frames that were captured.

It will be appreciated that any suitable image frame may be retrieved and communicated to the operation centre. For example, an image frame that is captured after occurrence of the impact may be retrieved and communicated to the operation centre. Alternatively, only image frames that were captured before occurrence of the impact may be retrieved and communicated to the operation centre.

It will further be appreciated that the object with which that train has collided may alternatively be identified automatically, for example using image recognition software.

Based on identification of the object of the collision, a decision may be made as to whether the train needs to stop or can continue without stopping. For example, if the object is livestock, such as a cow, the train may continue without stopping, but a decision can be made to reimburse the owner of the cow. Conversely, if the object is a person, then the train would need to stop.

In the embodiment shown in FIG. 1, the tagged image frame together with the image frame captured before the impact are communicated to the operation centre 116 via a communications network 118 such as the Internet. In this regard, the system 100 further comprises a network interface 120 that enables communication of data via the communications network 118. However, other implementations are envisaged. For example, if the train is at least partially controlled by a human operator, an image frame may be displayed on a display in the train.

In one embodiment, the impact detection system 100 further comprises an accelerometer 122 that is attached to a moveable coupler 124 disposed on a front area of the locomotive body 104 of the train. A coupler of a train is a component arranged to couple a railway vehicle to a further railway vehicle, such as a further train carriage, a further locomotive, an ore car, a fuel car or the like. In this regard, the coupler has a component that is moveable to absorb compression and tension movements between two railway vehicles. If a coupler is positioned at a front area of a train where no further railway vehicle is to be coupled to the train, the moveable component of the coupler is typically stationary for normal operations of the train. However, upon application of an impact on the front area of the train, the moveable component of the coupler moves towards the train. This movement may be measured using the accelerometer 122.

Referring back to FIG. 1, the accelerometer 122 that is attached to the moveable component of the coupler 124 is arranged to measure an acceleration of the movement of the component when an object impacts against the train. The accelerometer 122 is independent of the load sensitive sensors 102 and is arranged to detect head on collisions, which are more rare than side impact collisions detected by the load sensitive sensors 102. A signal generated by the accelerometer 122 is collected at the control unit 106 and compared against a threshold value. As with the load sensitive sensors 102, if the threshold value is exceeded a trigger signal is generated that causes at least one captured image to be automatically made available for inspection, for example by tagging a relevant image frame of the captured video stored at the storage device 112. The signals from the accelerometer 122 may be analysed with the electrical signals from the load sensitive sensors 102 at the control unit 106 so that both side and head on collisions are detected and a determination can be made as to the location of impact.

The system 100 further includes a discriminator to differentiate between actual collisions and electrical signals generated by the load sensitive sensors 102 that may be generated in error, namely detected impacts not caused by a collision with an object. Such false impact detections may be caused by electrical noise, vibrations experienced by the train, track surface anomalies or unexpected jolts to the train.

Figure 2:
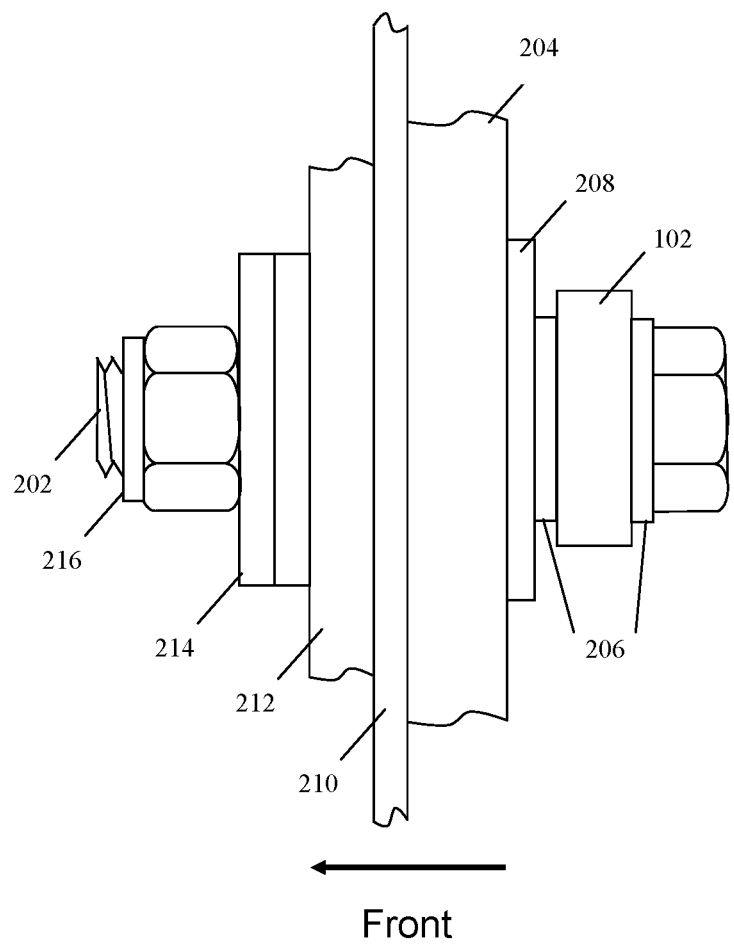
FIG. 2 is a schematic representation of a mounting arrangement of a load sensitive sensor of the impact detection system of FIG. 1.

Referring now to FIG. 2, there is illustrated a mounting arrangement for a load sensitive sensor 102 of the impact detection system 100 illustrated in FIG. 1.

In this embodiment, the load sensitive sensor is a force washer 102 attached to a bolt 202 that extends through a wall 204 of the locomotive body 104 of the train. The bolt 202 can be one of the bolts used to secure a cowcatcher to the locomotive body 104.

Specifically, the force washer 102 is located inside the locomotive body 104. Between the wall 204 and the head of the bolt 202, the force washer 102 is disposed between a pair of washers 206. A further washer 208 is positioned between the wall 204 and the force washer 102.

On the outside of the locomotive body 104, an optional bearing material 210, a mounting flange 212 and a further washer 214 are disposed on the bolt 202 and secured on the bolt 202 by a nut 216. It will be appreciated that this arrangement relates to an exemplary embodiment and other implementations for attaching the force washer 102 to the locomotive body 104 are envisaged.

In other embodiments of the invention, such as when applied to a truck, the force washer 102 can be provided on a nut joining a truck bumper to the truck.

In a further embodiment (not shown), the image capturing device 108 is arranged to capture at least one still image in response to the detection of a force of an impact at the sensors 102 that is above the predefined threshold value. It will be clear to a person skilled in the art that the still image will be captured immediately, e.g. less than 1 second, after the impact is detected such that upon inspection of the captured image the object can be identified.

In another embodiment (not shown), the impact detection system 100 is arranged to communicate an alert signal to the operation centre 116 when an impact is detected, the alert signal being indicative that at least one image is available.

The impact detection system may further be arranged to facilitate retrieval of at least one captured image by an operator at the operation centre 116. However, it will be appreciated that the operator will need to retrieve the image immediately after the impact is detected such that a decision can be made as to whether the train needs to stop or can continue without stopping.

Figure 3:
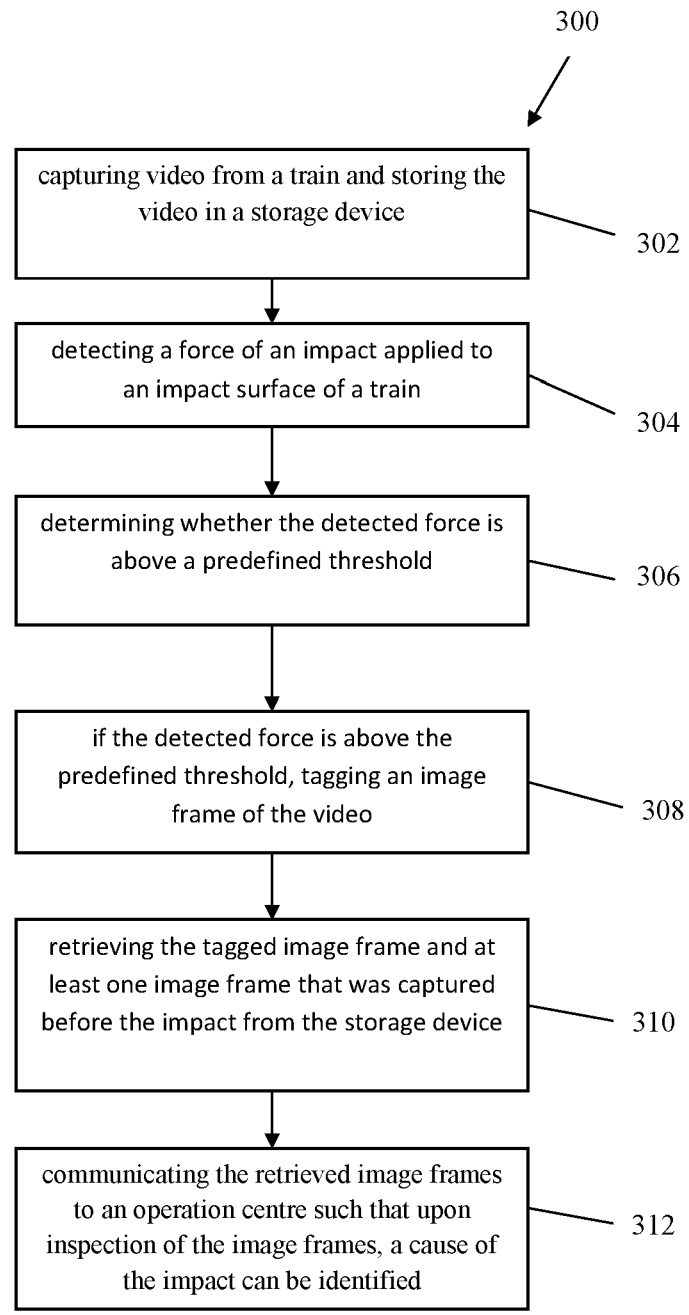
FIG. 3 is a flow chart illustrating a method of detecting an impact in accordance with an embodiment of the present invention.

Referring now to FIG. 3 of the accompanying drawings, there is shown a flowchart illustrating a method 300 of detecting an impact on a train in accordance with an embodiment of the present invention. The method 300 may for example be implemented by the impact detection system 100 shown in FIG. 1.

Initially, video is continuously captured 302 from the train and image frames of the video are stored 302 in the data storage device 116 of the impact detection system 100.

In a next step, a characteristic of an object impacting the train during a collision is detected 304. The impact force may for example relate to a collision of the train with a stationary or moving object. It is further determined 306 whether the detected characteristic of the impact exceeds a predefined threshold value. If the detected characteristic is above the predefined threshold value, an image frame that is indicative of a field of view of the object substantially at impact is tagged 308 in response to detection of the collision in step 304.

In a further step, the tagged image frame, optionally together with at least one further image frame which was captured before and/or after the collision, are retrieved 310 from the storage device 112 and communicated 312 to the operation centre 116. Upon inspection of the image frames at the operation centre 116, an operator can identify the object.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An impact detection system for an autonomously controlled train, the impact detection system comprising:
    a sensor arrangement arranged to measure a characteristic of an impact of an object against the autonomously controlled train;
    a trigger determiner associated with the sensor arrangement for determining whether the characteristic of the impact is greater than a predefined threshold value; and
    an image capturing device arranged to capture an image of the object;
    wherein the system is arranged to:
        automatically make the captured image available for inspection in response to the trigger determiner determining that the characteristic of the impact is greater than the predefined threshold value;
        send the captured image to a remote operation center for analysis so that the object in the image can be identified and a decision made as to whether to stop the autonomously controlled train; and
        communicate a stop decision to the autonomously controlled train if the decision is to stop the autonomously controlled train in real-time.

2. An impact detection system as claimed in claim 1, comprising a storage device, wherein the image capturing device is arranged to continuously capture images and store the images in the storage device, and the system is arranged to retrieve the captured image of the object from the storage device in response to the trigger determiner determining that the characteristic of the impact is greater than the predefined threshold value.

3. An impact detection system as claimed in claim 2, wherein the system is arranged to tag the captured image of the object in the storage device in response to the trigger determiner determining that the characteristic of the impact is greater than the predefined threshold value, and to make the tagged image available for inspection so that the object in the image can be identified in real-time.

4. An impact detection system as claimed in claim 1, wherein the image capturing device is arranged to capture an image of the object in response to the trigger determiner determining that the characteristic of the impact is greater than the predefined threshold value.

5. An impact detection system as claimed in claim 1, wherein the sensor arrangement comprises a transducer capable of generating an electrical signal that varies according to impact force applied to the transducer.

6. An impact detection system as claimed in claim 5, wherein the transducer is a force washer.

7. An impact detection system as claimed in claim 5, wherein the sensor arrangement comprises an array of transducers and wherein the signals generated by the transducers are combined.

8. An impact detection system as claimed in claim 1, wherein the sensor arrangement comprises an accelerometer arranged to generate an electrical signal that varies in response to movement of a part of the vehicle caused by a head-on impact, and the system is arranged to:
    determine whether a magnitude of the electrical signal is greater than a predefined threshold value; and
    automatically make a captured image available for inspection in response to determining that the magnitude of the electrical signal is greater than the predefined threshold value so that the object in the image can be identified in real-time.

9. An impact detection system as claimed in claim 1, comprising a discriminator arranged to discriminate between signals generated by a collision with an object and signals generated in error by a non-collision.

10. An impact detection system as claimed in claim 9, wherein the discriminator is arranged to recognize signals generated in error resulting from:
    vibrations experienced by the vehicle as the vehicle moves during use;
    surface anomalies of a surface on which the vehicle is travelling; and/or
    electrical noise.

11. An impact detection system as claimed in claim 1, wherein the predefined threshold value is equivalent to an impact by an object having a relative momentum with respect to the vehicle greater than 150 kg·m·s$^{-1}$.

12. An impact detection system as claimed in claim 1, wherein the image capturing device comprises a camera arranged to capture a still image and/or video.

13. An impact detection system as claimed in claim 1, comprising a communication system arranged to communicate with a remote operation centre center, wherein the system is arranged to use the communications system to automatically communicate the captured image to the operation center in response to the trigger determiner determining that the characteristic of the impact is greater than the predefined threshold value so that the object in the image can be identified in real-time at the operation center.

14. An impact detection system as claimed claim 13, wherein the system is arranged to send an alert signal to the operation center to indicate to the operation center that a captured image is available for inspection.

15. An impact detection system as claimed in claim 1, wherein the system is arranged to analyze the image so as to automatically identify the object.

16. A railroad train or road vehicle including an impact detection system as claimed in claim 1.

17. A method of detecting an object colliding with an autonomously controlled train, the method comprising:
   determining a characteristic of an impact of the object against the autonomously controlled train;
   determining whether the characteristic of the impact is greater than a predefined threshold value;
   capturing an image of the object;
   automatically making the captured image available for inspection in response to the trigger determiner determining that the characteristic of the impact is greater than the predefined threshold value; determining whether the characteristic of the impact is greater than a predefined threshold value;
   sending the captured image to a remote operation center for analysis so that the object in the image can be identified and a decision made as to whether to stop the autonomously controlled train; and
   communicating a stop decision to the autonomously controlled train if the decision is to stop the autonomously controlled train.

18. A method as claimed in claim 17, comprising continuously capturing images, storing the images in the storage device, and retrieving the captured image of the object from the storage device in response to determining that the characteristic of the impact is greater than the predefined threshold value.

19. A method as claimed in claim 18, comprising tagging the captured image of the object in the storage device in response to determining that the characteristic of the impact is greater than the predefined threshold value, and making the tagged image available for inspection so that the object in the image can be identified in real-time.

20. A method as claimed in claim 17, comprising capturing an image of the object in response to determining that the characteristic of the impact is greater than the predefined threshold value.

21. A method as claimed in claim 17, comprising using a transducer capable of generating an electrical signal that varies according to impact force applied to the transducer to determine the characteristic of an impact of the object against the vehicle.

22. A method as claimed in claim 17, comprising discriminating between signals generated by a collision with an object and signals generated in error by a non-collision.

23. A method as claimed in claim 22, wherein the discriminating step comprises recognizing signals generated in error resulting from:
   vibrations experienced by the vehicle as the vehicle moves during use;
   surface anomalies of a surface on which the vehicle is travelling; and/or
   electrical noise.

24. A method as claimed in claim 17, wherein the predefined threshold value is equivalent to an impact by an object having a relative momentum with respect to the vehicle greater than 150 $kg \cdot m \cdot s^{-1}$.

25. A method as claimed in claim 17, comprising capturing a still image and/or a video recording of the object.

26. A method as claimed in claim 17, comprising automatically communicating the captured image to an operation center in response to the trigger determiner determining that the characteristic of the impact is greater than the predefined threshold value so that the object in the image can be identified in real-time.

27. A method as claimed in claim 26, comprising sending an alert signal to the operation center to indicate to the operation center that a captured image is available for inspection.

28. A method as claimed in claim 17, comprising analyzing the image so as to automatically identify the object.

* * * * *